(12) United States Patent
Vanhoucke et al.

(10) Patent No.: US 8,989,451 B2
(45) Date of Patent: *Mar. 24, 2015

(54) COMPUTER-IMPLEMENTED METHOD FOR PERFORMING SIMILARITY SEARCHES

(75) Inventors: Vincent Vanhoucke, Menlo Park, CA (US); Salih Burak Gokturk, Mountain View, CA (US); Dragomir Anguelov, San Francisco, CA (US); Kuang-chih Lee, Union City, CA (US); Munjal Shah, Palo Alto, CA (US); Ashwin Tengli, Bangalore (IN)

(73) Assignee: Google Inc., Mountain View, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/618,226

(22) Filed: Sep. 14, 2012

(65) Prior Publication Data

US 2013/0136319 A1    May 30, 2013

Related U.S. Application Data

(63) Continuation of application No. 12/819,901, filed on Jun. 21, 2010, now Pat. No. 8,311,289, which is a continuation of application No. 11/777,070, filed on Jul. 12, 2007, now Pat. No. 7,760,917, and a (Continued)

(51) Int. Cl.
*G06K 9/00* (2006.01)
*G06F 17/30* (2006.01)

(52) U.S. Cl.
CPC ...... *G06K 9/00375* (2013.01); *G06F 17/30253* (2013.01); *G06F 17/30256* (2013.01); *G06F 17/30265* (2013.01); *G06K 9/00288* (2013.01); *G06K 9/00677* (2013.01); *G06K 2009/00328* (2013.01)
USPC .......................................... 382/115

(58) Field of Classification Search
USPC ................................... 382/115, 118
See application file for complete search history.

(56) References Cited

U.S. PATENT DOCUMENTS

| | | | |
|---|---|---|---|
| 5,296,945 | A | 3/1994 | Nishikawa et al. |
| 5,450,504 | A | 9/1995 | Calia |
| 5,734,749 | A | 3/1998 | Yamada et al. |
| 5,781,650 | A | 7/1998 | Lobo et al. |
| 5,845,639 | A | 12/1998 | Hochman et al. |
| 5,901,246 | A | 5/1999 | Hoffberg et al. |
| 5,982,912 | A | 11/1999 | Fukui et al. |
| 6,035,055 | A | 3/2000 | Wang et al. |

(Continued)

FOREIGN PATENT DOCUMENTS

| | | |
|---|---|---|
| JP | 03188586 A | 8/1991 |
| JP | 2002-328925 | 11/2002 |

(Continued)

OTHER PUBLICATIONS

U.S. Appl. No. 12/395,422, filed Feb. 27, 2009, Gokturk et al.

(Continued)

*Primary Examiner* — John Strege
(74) *Attorney, Agent, or Firm* — Fish & Richardson P.C.

(57) ABSTRACT

A similarity search may be performed on the image of a person, using visual characteristics and information that is known about the person. The search identifies images of other persons that are similar in appearance to the person in the image.

17 Claims, 3 Drawing Sheets

Related U.S. Application Data continuation-in-part of application No. 11/246,742, filed on Oct. 7, 2005, now Pat. No. 7,519,200, and a continuation-in-part of application No. 11/246,741, filed on Oct. 7, 2005, now Pat. No. 7,809,722, and a continuation-in-part of application No. 11/246,589, filed on Oct. 7, 2005, now Pat. No. 7,809,192, and a continuation-in-part of application No. 11/246,434, filed on Oct. 7, 2005, now Pat. No. 7,783,135.

(60) Provisional application No. 60/807,120, filed on Jul. 12, 2006, provisional application No. 60/679,591, filed on May 9, 2005.

(56) References Cited

U.S. PATENT DOCUMENTS

| | | |
|---|---|---|
| 6,173,068 B1 | 1/2001 | Prokoski |
| 6,353,823 B1 | 3/2002 | Kumar |
| 6,381,346 B1 | 4/2002 | Eraslan |
| 6,397,219 B2 | 5/2002 | Mills |
| 6,418,430 B1 | 7/2002 | DeFazio et al. |
| 6,427,020 B1 | 7/2002 | Rhoads |
| 6,470,336 B1 | 10/2002 | Matsukawa et al. |
| 6,546,185 B1 | 4/2003 | Kim et al. |
| 6,549,913 B1 | 4/2003 | Murakawa |
| 6,556,196 B1 | 4/2003 | Blanz et al. |
| 6,556,713 B2 | 4/2003 | Kobayashi et al. |
| 6,564,225 B1 | 5/2003 | Brogliatti et al. |
| 6,606,417 B1 | 8/2003 | Brechner |
| 6,624,843 B2 | 9/2003 | Lennon |
| 6,785,421 B1 | 8/2004 | Gindele et al. |
| 6,792,135 B1 | 9/2004 | Toyama |
| 6,801,641 B2 | 10/2004 | Eraslan |
| 6,819,783 B2 | 11/2004 | Goldberg et al. |
| 6,919,892 B1 | 7/2005 | Cheiky et al. |
| 6,925,197 B2 | 8/2005 | Dimitrova et al. |
| 6,928,231 B2 | 8/2005 | Tajima |
| 6,937,745 B2 | 8/2005 | Toyama |
| 6,999,614 B1 | 2/2006 | Bakker et al. |
| 7,006,236 B2 | 2/2006 | Tomasi et al. |
| 7,006,881 B1 | 2/2006 | Hoffberg et al. |
| 7,027,054 B1 | 4/2006 | Cheiky et al. |
| 7,027,620 B2 | 4/2006 | Martinez |
| 7,054,468 B2 | 5/2006 | Yang |
| 7,140,550 B2 | 11/2006 | Ramachandran |
| 7,203,356 B2 | 4/2007 | Gokturk et al. |
| 7,242,988 B1 | 7/2007 | Hoffberg et al. |
| 7,310,431 B2 | 12/2007 | Gokturk et al. |
| 7,324,693 B2 | 1/2008 | Chen |
| 7,340,077 B2 | 3/2008 | Gokturk et al. |
| 7,349,020 B2 | 3/2008 | Stavely et al. |
| 7,382,903 B2 | 6/2008 | Ray |
| 7,519,200 B2 | 4/2009 | Gokturk et al. |
| 7,542,610 B2 | 6/2009 | Gokturk et al. |
| 7,583,271 B2 | 9/2009 | Kawakami et al. |
| 7,643,671 B2 | 1/2010 | Dong et al. |
| 7,650,319 B2 | 1/2010 | Hoffberg et al. |
| 7,657,100 B2 | 2/2010 | Gokturk et al. |
| 7,657,126 B2 | 2/2010 | Gokturk et al. |
| 7,660,468 B2 | 2/2010 | Gokturk et al. |
| 7,681,140 B2 | 3/2010 | Ebert |
| 7,689,043 B2 | 3/2010 | Austin et al. |
| 7,698,136 B1 | 4/2010 | Nguyen et al. |
| 7,711,155 B1 | 5/2010 | Sharma et al. |
| 7,742,046 B2 | 6/2010 | Fukushima et al. |
| 7,760,917 B2* | 7/2010 | Vanhoucke et al. ......... 382/115 |
| 7,761,713 B2 | 7/2010 | Baar |
| 7,787,025 B2 | 8/2010 | Sanno et al. |
| 7,853,085 B2 | 12/2010 | Miller |
| 7,920,187 B2 | 4/2011 | Sanno et al. |
| 7,996,218 B2 | 8/2011 | Kim et al. |
| 8,010,458 B2 | 8/2011 | Galbreath et al. |
| 8,165,916 B2 | 4/2012 | Hoffberg et al. |
| 8,311,289 B2* | 11/2012 | Vanhoucke et al. ......... 382/115 |
| 2001/0033690 A1 | 10/2001 | Berche et al. |
| 2002/0097893 A1 | 7/2002 | Lee et al. |
| 2002/0103813 A1 | 8/2002 | Frigon |
| 2002/0107718 A1 | 8/2002 | Morrill et al. |
| 2002/0114522 A1 | 8/2002 | Seeber |
| 2002/0156686 A1 | 10/2002 | Kraft et al. |
| 2002/0187774 A1 | 12/2002 | Ritter et al. |
| 2003/0028451 A1 | 2/2003 | Ananian |
| 2003/0063778 A1 | 4/2003 | Rowe et al. |
| 2003/0063779 A1 | 4/2003 | Wrigley |
| 2003/0169906 A1 | 9/2003 | Gokturk et al. |
| 2003/0195901 A1 | 10/2003 | Shin et al. |
| 2003/0202683 A1 | 10/2003 | Ma et al. |
| 2004/0003001 A1 | 1/2004 | Shimura |
| 2004/0102971 A1 | 5/2004 | Lipscher et al. |
| 2004/0215657 A1 | 10/2004 | Drucker et al. |
| 2004/0264810 A1 | 12/2004 | Taugher et al. |
| 2005/0002568 A1 | 1/2005 | Chupeau et al. |
| 2005/0033641 A1 | 2/2005 | Jha et al. |
| 2005/0078885 A1 | 4/2005 | Ozaki et al. |
| 2005/0094897 A1 | 5/2005 | Zuniga |
| 2005/0102201 A1 | 5/2005 | Linker et al. |
| 2005/0111737 A1 | 5/2005 | Das et al. |
| 2005/0271304 A1 | 12/2005 | Retterath et al. |
| 2006/0008150 A1 | 1/2006 | Zhao et al. |
| 2006/0053342 A1 | 3/2006 | Bazakos et al. |
| 2006/0097988 A1 | 5/2006 | Hong |
| 2006/0133699 A1 | 6/2006 | Widrow et al. |
| 2006/0136982 A1 | 6/2006 | Martinolich et al. |
| 2006/0143176 A1 | 6/2006 | Mojsilovic et al. |
| 2006/0173560 A1 | 8/2006 | Widrow et al. |
| 2006/0227992 A1 | 10/2006 | Rathus et al. |
| 2006/0251292 A1 | 11/2006 | Gokturk et al. |
| 2006/0251338 A1 | 11/2006 | Gokturk et al. |
| 2006/0251339 A1 | 11/2006 | Gokturk et al. |
| 2006/0253491 A1 | 11/2006 | Gokturk et al. |
| 2007/0003113 A1 | 1/2007 | Goldberg |
| 2007/0078846 A1 | 4/2007 | Gulli et al. |
| 2007/0081744 A1 | 4/2007 | Gokturk et al. |
| 2007/0098303 A1 | 5/2007 | Gallagher et al. |
| 2007/0258645 A1 | 11/2007 | Gokturk et al. |
| 2008/0080745 A1 | 4/2008 | Gokturk et al. |
| 2008/0082426 A1 | 4/2008 | Gokturk et al. |
| 2008/0091572 A1 | 4/2008 | Kraft et al. |
| 2008/0109841 A1 | 5/2008 | Heather et al. |
| 2008/0144943 A1 | 6/2008 | Gokturk et al. |
| 2008/0152231 A1 | 6/2008 | Gokturk et al. |
| 2008/0154625 A1 | 6/2008 | Serbanescu |
| 2008/0162269 A1 | 7/2008 | Gilbert |
| 2008/0162574 A1 | 7/2008 | Gilbert |
| 2008/0177640 A1 | 7/2008 | Gokturk et al. |
| 2008/0199075 A1 | 8/2008 | Gokturk et al. |
| 2008/0212849 A1 | 9/2008 | Gao |
| 2008/0212899 A1 | 9/2008 | Gokturk et al. |
| 2009/0019008 A1 | 1/2009 | Moore et al. |
| 2009/0034782 A1 | 2/2009 | Gering |
| 2009/0177628 A1 | 7/2009 | Yanagisawa et al. |
| 2009/0196510 A1 | 8/2009 | Gokturk et al. |
| 2009/0208116 A1 | 8/2009 | Gokturk et al. |
| 2009/0248599 A1 | 10/2009 | Hueter et al. |
| 2010/0082604 A1 | 4/2010 | Gutt et al. |
| 2010/0135582 A1 | 6/2010 | Gokturk et al. |
| 2010/0135597 A1 | 6/2010 | Gokturk et al. |

FOREIGN PATENT DOCUMENTS

| | | |
|---|---|---|
| JP | 2003-216866 A | 7/2003 |
| JP | 2004-220074 A | 8/2004 |
| JP | 2006-119836 | 11/2006 |
| KR | 1020070077908 A | 7/2007 |

OTHER PUBLICATIONS

U.S. Appl. No. 12/431,706, filed Apr. 28, 2009, Gokturk et al.
U.S. Appl. No. 11/246,741, filed Oct. 7, 2005, Gokturk et al.
U.S. Appl. No. 11/936,694, filed Nov. 7, 2007, Gokturk et al.
U.S. Appl. No. 11/936,705, filed Nov. 7, 2007, Gokturk et al.
U.S. Appl. No. 11/936,713, filed Nov. 7, 2007, Gokturk et al.
U.S. Appl. No. 11/936,734, filed Nov. 7, 2007, Gokturk et al.

(56) References Cited

OTHER PUBLICATIONS

Final Office Action dated Oct. 20, 2008 for U.S. Appl. No. 11/543,758, 7 Pages.
Final Office Action dated Aug. 11, 2008 for U.S. Appl. No. 11/246,741, 18 Pages.
Final Office Action dated Jun. 30, 2009 for U.S. Appl. No. 11/246,589, 13 Pages.
Final Office Action dated Jul. 7, 2009 for U.S. Appl. No. 11/777,070, 10 Pages.
Final Office Action dated Jun. 16, 2009 for U.S. Appl. No. 11/936,705, 20 Pages.
International Preliminary Report on Patentability and Written Opinion of the International Searching Authority in Application PCT/US2006/018016, Oct. 16, 2008, 12 pages.
International Preliminary Report on Patentability in Application PCT/US2006/038864, Dec. 11, 2008, 10 pages.
International Preliminary Report on Patentability and Written Opinion of the International Searching Authority in Application PCT/US2007/083935, May 22, 2009, 20 pages.
International Search Report and Written Opinion of the International Searching Authority in Application PCT/US06/18016, U.S. International Searching Authority, Jun. 17, 2008, 17 pages.
International Search Report and Written Opinion of the International Searching Authority in Application PCT/US06/38864, U.S. International Searching Authority, Oct. 14, 2008, 16 pages.
International Search Report and Written Opinion of the International Searching Authority in Application PCT/US07/83935, U.S. International Searching Authority, Aug. 18, 2008, 23 pages.
Non-Final Office Action dated Oct. 16, 2008 for U.S. Appl. No. 11/777,070, 10 Pages.
Non-Final Office Action dated Oct. 21, 2008 for U.S. Appl. No. 11/936,705, 18 Pages.
Non-Final Office Action dated Oct. 27, 2008 for U.S. Appl. No. 11/246,434, 11 Pages.
Non-Final Office Action dated May 28, 2009 for U.S. Appl. No. 11/246,434, 6 Pages.
Non-Final Office Action dated Oct. 27, 2008 for U.S. Appl. No. 11/936,734, 7 Pages.
Non-Final Office Action dated Dec. 29, 2008 for U.S. Appl. No. 11/246,589, 19 Pages.
Non-Final Office Action dated Dec. 30, 2008 for U.S. Appl. No. 11/936,713, 15 Pages.
Non-Final Office Action dated Apr. 7, 2009 for U.S. Appl. No. 11/246,741, 21 Pages.
Non-Final Office Action dated Dec. 6, 2007 for U.S. Appl. No. 11/246,741, 31 Pages.
Non-Final Office Action dated Jun. 3, 2008 for U.S. Appl. No. 11/246,742, 16 Pages.
Non-Final Office Action dated Jun. 6, 2008 for U.S. Appl. No. 11/543,758, 13 Pages.
Non-Final Office Action dated Aug. 6, 2009 for U.S. Appl. No. 11/936,734, 6 Pages.
Notice of Allowance dated Dec. 22, 2008 for U.S. Appl. No. 11/246,742, 12 Pages.
Notice of Allowance dated Apr. 17, 2009 for U.S. Appl. No. 11/543,758, 14 Pages.
Tu, Zhuowen et al., "Image Parsing: Unifying Segmentation, Detection, and Recognition," Proceedings of the Ninth IEEE International Conference on Computer Vision (ICCV 2003), University of California, Los Angeles, Los Angeles, CA 90095, 7 pages.
Yuille, A.L. et al, "Signfinder: Using Color to detect, localize and identify informational signs," Proceedings International Conference on Computer Vision, ICCV, 1998, Smith-Kettlewell Eye Research Institute, 2318 Fillmore Street, San Francisco, CA 94115, 9 pages.
Notice of Allowance dated Oct. 1, 2009 for U.S. Appl. No. 11/936,734, 12 Pages.
Notice of Allowance dated Sep. 28, 2009 for U.S. Appl. No. 11/936,713, 15 Pages.
Final Office Action dated Oct. 27, 2009 for U.S. Appl. No. 11/246,741, 20 Pages.
Non-Final Office Action dated Sep. 14, 2009 for U.S. Appl. No. 11/246,434. 11 pages.
Non-Final Office Action dated Sep. 30, 2009 for U.S. Appl. No. 12/431,706. 9 pages.
Notice of Allowance dated Sep. 17, 2009 for U.S. Appl. No. 11/936,705 14 Pages.
Non-Final Office Action dated Dec. 2, 2009 for U.S. Appl. No. 11/246,589. 14pages.
Non-Final Office Action dated Dec. 15, 2009 for U.S. Appl. No. 12/395,422. 10pages.
Notice of Allowance dated Feb. 22, 2010 for U.S. Appl. No. 11/246,343. 6pages.
Liu, James et al., Smart Shopper: An Agent-Based Web-Mining Approach to Internet Shopping, IEEE Transactions on Fuzzy Systems, vol. 11, No. 2, Apr. 2003,12 pages.
Gangopadhyay, Aryya, "An image-based system for electronic retailing", Decision Support Systems 32, 2001, Department of Information Systems, University of Maryland Baltimore County, 1000 Hilltop Circle, ACIV 481, Baltimore, MD 21250, 10 pages.
Lii, Yi et al., "Object Recognition for Content-Based Image Retrieval", Department of Computer Science and Engineering, University of Washington, Seattle, WA 98195-2350, Jan. 2002, 21 pages.
Wang, James et al., "SIMPLIcity: Semantics-Sensitive Integrated Matching for Picture Libraries" IEEE Transactions on Pattern Analysis and Machine Intelligence, vol. 23, No. 9, Sep. 2001, 17 pages.
Notice of Allowance dated Mar. 1, 2010 for U.S. Appl. No. 11/777,070 11 pages.
International Search Report and Written Opinion mailed Feb. 24, 2010 in PCT/US2009/050600 13 pgs.
Order Granting/Denying Request for Inter Parts Reexamination mailed Apr. 26, 2010 for U.S. Appl. No. 95/001,30; 15 pages.
Action Closing Prosecution mailed Apr. 26, 2010 for U.S. Appl. No. 95/001,307; 20 pages.
Final Office Action mailed May 12, 2010 for U.S. Appl. No. 12/431,706; 12 pages.
Replacement Request for Ex Parte Reexamination dated Mar. 18, 2010 for U.S. Appl. No. 95/001,307, 145 pages.
Notice of Allowance dated Jun. 2, 2010 for U.S. Appl. No. 11/777,070 16 pages.
Final Office Action dated Jun. 2, 2010 for U.S. Appl. No. 12/395,422. 21 pages.
Notice of Allowance dated Jun. 9, 2010 for U.S. Appl. No. 11/246,434 11 pages.
Notice of Allowance dated Aug. 17, 2010 for U.S. Appl. No. 11/246,741, 23 pages.
Notice of Allowance dated Aug. 11, 2010 for U.S. Appl. No. 11/246,589, 10 pages.
Non-Final Office Action dated Oct. 7, 2010 for U.S. Appl. No. 11/841,355, 15 pages.
Weinberger et al., "Nonlinear Dimensionality Reduction by Semidefinite Programming and Kernel Matrix Factorization", Proceedings of the 10th International Workshop on Artificial Intelligence and Statistics, 2005, pp. 381-388.
Roweis et al., "Nonlinear Dimensionality Reduction by Locally Linear Embedding", Science, vol. 290, Dec. 22, 2000, pp. 2323-2326.
Weinberger et al., Distance Metric Learning for Large Margin Nearest Neighbor Classification, Advances in Neural Information Processing Systems, vol. 18, 2006, pp. 1473-1480.
International Search Report, Written Opinion and Notice of Transmittal of same mailed Aug. 17, 2010 in PCT/US10/037139 10 pages.
Notice of Allowance dated Oct. 29, 2010 for U.S. Appl. No. 12/431,706; 9 pages.
Arnold W.M. Smeulders, et al., "Content-Based Image Retrieval at the End of the Early Years", IEEE Transactions on Pattern Analysis and Machine Intelligence, vol. 22, No. 12. Dec. 2000, 32 pages.
Charles Frankel, et al., "WebSeer: An Image Search Engine for the World Wide Web", The University of Chicago, Computer Science Department, 110 East 58th Street, Chicago, Illinois 60637, Technical Report 96-14, Aug. 1, 1996, 24 pages.
Philippe Aigrain, et al., "Content-Based Representation and Retrieval of Visual Media: A State-of-the-Art Review", Multimedia Tools and Applications 3, 179-202, 1996, 24 pages.

(56) References Cited

OTHER PUBLICATIONS

Non-Final Office Action dated Feb. 7, 2011 for U.S. Appl. No. 12/395,422, 10 pages.
Non-Final Office Action dated Feb. 7, 2011 for U.S. Appl. No. 11/685,106, 12 pages.
Notice of Allowance dated Jan. 5, 2011 for U.S. Appl. No. 12/431,706; 9 pages.
Non-Final Office Action dated Mar. 25, 2011 for U.S. Appl. No. 11/777,894, 24 pages.
Non-Final Office Action dated Aug. 17, 2011 for U.S. Appl. No. 11/936,694, 8 pages.
Final Office Action dated Sep. 6, 2011 for U.S. Appl. No. 12/395,422, 11 pages.
Non-Final Office Action dated Oct. 12, 2011 for U.S. Appl. No. 12/819,901, 17 pages.
Non-Final Office Action dated Oct. 12, 2011 for U.S. Appl. No. 12/648,245, 17 pages.
Supplemental European Search Report dated Sep. 30, 2011 for EP Application No. 07868686.2, 8 pages.
Non-Final Office Action dated Oct. 21, 2011 for U.S. Appl. No. 12/962,494, 11 pages.
Notice of Allowance dated Nov. 10, 2011 for U.S. Appl. No. 12/819,970, 22 pages.
Non-Final Office Action dated Nov. 23, 2011 for U.S. Appl. No. 13/088,277, 10 pages.
Non-Final Office Action dated Nov. 22, 2011 for U.S. Appl. No. 12/961,790, 34 pages.
Non-Final Office Action dated Aug. 4, 2011 for U.S. Appl. No. 11/841,355, 22 pages.
Final Office Action dated Dec. 6, 2011 for U.S. Appl. No. 11/777,894, 29 pages.
Non-Final Office Action dated Jan. 4, 2012 for U.S. Appl. No. 12/648,287, 17 pages.
Supplemental European Search Report dated Dec. 16, 2011 for EP Application No. 09798677.2, 8 pages.
Non-Final Office Action mailed Jan. 17, 2012, for U.S. Appl. No. 12/182,122, filed Jul. 29, 2008.
Final Office Action dated Feb. 23, 2012, issued in U.S. Appl. No. 12/503,034, filed Jul. 14, 2009.
Final Office Action dated Apr. 17, 2012, issued in U.S. Appl. No. 11/685,106, filed Mar. 12, 2007.
English translation of Chinese Office Action issued on May 2, 2012 in Chinese Application No. 200980132387.7.
Final Office Action dated Jun. 13, 2012, issued in U.S. Appl. No. 12/962,494, filed Dec. 7, 2010.
Yamaguchi et al., "'Smartface'—A Robust Face Recognition System under Varying Facial Pose and Expression*" IEICE Trans. Inf. & Syst., E86(1):37-44, Jan. 2003.
Notice of Allowance dated Jun. 19, 2012, issued in U.S. Appl. No. 12/819,901, filed Jun. 21, 2010.
Final Office Action dated Jun. 25, 2012, issued in U.S. Appl. No. 12/961,790, filed Dec. 7, 2010.
Final Office Action dated Aug. 7, 2012, issued in U.S. Appl. No. 12/182,122, filed Jul. 29, 2008.
Notice of Allowance mailed Jul. 11, 2012, issued in U.S. Appl. No. 13/088,277, filed Apr. 15, 2011.
Non-Final Office Action dated Nov. 27, 2012, issued in U.S. Appl. No. 13/371,196, filed Feb. 10, 2012.
Non-Final Office Action dated Mar. 27, 2013, issued in U.S. Appl. No. 13/371,196, filed Feb. 10, 2012.
Notice of Allowance dated Feb. 13, 2009, issued in U.S. Appl. No. 11/246,742, filed Oct. 7, 2005.
Notice of Allowance dated Dec. 10, 2012, issued in U.S. Appl. No. 12/182,122, filed Jul. 29, 2008.
Final Office Action dated Apr. 11, 2013, issued in U.S. Appl. No. 11/777,894, filed Jul. 13, 2007.
Non-Final Office Action dated Nov. 20, 2012, issued in U.S. Appl. No. 11/777,894, filed Jul. 13, 2007.
Non-Final Office Action dated Jul. 17, 2013, issued in U.S. Appl. No. 11/777,894, filed Jul. 13, 2007.
Notice of Allowance dated Sep. 5, 2012 issued in U.S. Appl. No. 12/648,287, filed Dec. 28, 2009.
Notice of Allowance mailed Jul. 13, 2012, issued in U.S. Appl. No. 12/648,275, filed Dec. 28, 2009.
Office Action dated Sep. 12, 2012, issued in U.S. Appl. No. 12/503,034, filed Jul. 14, 2009.
Notice of Allowance dated Jun. 21, 2013 issued in U.S. Appl. No. 11/685,106, filed Mar. 12, 2007.
Non-Final Office Action dated Feb. 14, 2013 issued in U.S. Appl. No. 11/685,106, filed Mar. 12, 2007.
Notice of Allowance dated Oct. 24, 2012 issued in U.S. Appl. No. 12/961,790, filed Dec. 7, 2010.
Non-Final Office Action dated Feb. 28, 2013 issued on U.S. Appl. No. 12/962,494, filed Dec. 7, 2010.

* cited by examiner

COMPUTER-IMPLEMENTED METHOD FOR PERFORMING SIMILARITY SEARCHES

RELATED APPLICATIONS

This application is a continuation of Ser. No. 12/819,901, filed Jun. 21, 2010, U.S. Pat. No. 8,311,289, which is a continuation of Ser. No. 11/777,070, filed Jul. 12, 2007, now U.S. Pat. No. 7,760,917, which claims benefit of priority to:

(i) U.S. Provisional Patent Application No. 60/807,120, filed Jul. 12, 2006; and is a continuation-in-part of U.S. application Ser. No. 11/246,742, filed Oct. 7, 2005, now U.S. Pat. No. 7,519,200; which claims benefit of 60/679,591, filed May 9, 2005;

(ii) is a continuation-in-part of U.S. patent application Ser. No. 11/246,741, filed Oct. 7, 2005, now U.S. Pat. No. 7,809,722, which claims benefit of priority to U.S. Provisional Patent Application No. 60/679,591, filed May 9, 2005;

(iii) is a continuation-in-part of U.S. patent application Ser. No. 11/246,589, filed on Oct. 7, 2005; now U.S. Pat. No. 7,809,192, which claims benefit of priority to U.S. Provisional Patent Application No. 60/679,591, filed May 9, 2005;

(iv) is a continuation-in-part of U.S. patent application Ser. No. 11/246,434, filed on Oct. 7, 2005; now U.S. Pat. No. 7,783,135, which claims benefit of priority to U.S. Provisional Patent Application No. 60/679,591, filed May 9, 2005; and all of the aforementioned priority applications are hereby incorporated by reference in their entirety.

TECHNICAL FIELD

The disclosed embodiments relate generally to a computer-implemented method for performing similarity searches, such as of persons and faces.

BACKGROUND

Digital photography has become a consumer application of great significance. It has afforded individuals convenience in capturing and sharing digital images. Devices that capture digital images have become low-cost, and the ability to send pictures from one location to the other has been one of the driving forces in the drive for more network bandwidth.

Due to the relative low cost of memory and the availability of devices and platforms from which digital images can be viewed, the average consumer maintains most digital images on computer-readable mediums, such as hard drives, CD-Roms, and flash memory. The use of file folders are the primary source of organization, although applications have been created to aid users in organizing and viewing digital images. Some search engines, such as GOOGLE, also enables users to search for images, primarily by matching text-based search input to text metadata or content associated with images.

BRIEF DESCRIPTION OF THE DRAWINGS

FIG. 1 illustrates

DETAILED DESCRIPTION

Figure 1:
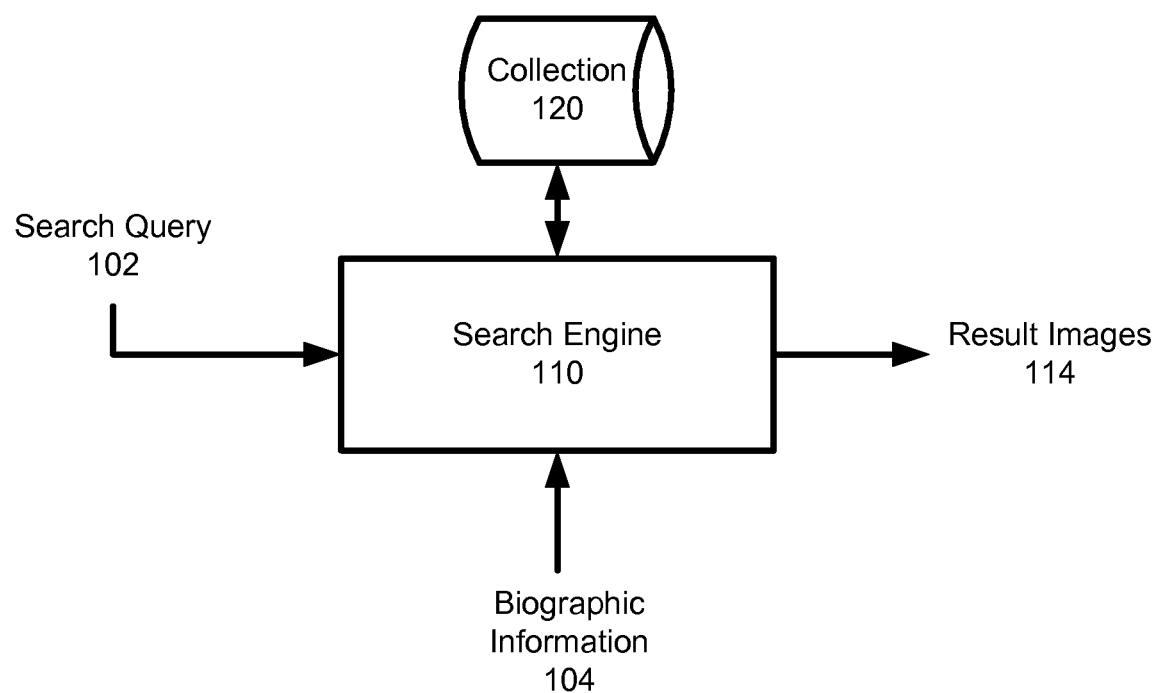
FIG. 1 illustrates a simplified system for performing similarity searching of persons using various kinds of information, according to an embodiment of the invention.

Embodiments described herein provide a system and method for performing similarity searches or comparisons of people. In particular, embodiments described herein provide for performing similarity searching to compare images of persons and faces against those of other in order to find persons who are similar in appearance. Face similarity searching, in particular, may be used to identify faces of persons who look like one another.

Numerous usages for person or face similarity search exist. For example, on a social network site, face similarity can be used to cluster individuals who are deemed to look like on another, as a means of introduction. On an online dating site, similarity searching can be used to enable a customer to identify persons in a dating pool that have a specific type of appearance or visual characteristic that the customer prefers. For example, a person may seek other persons who resemble a favorite movie star. A face similarity engine may also be used to identify persons who look like one another for purposes of amusement.

One or more embodiments enable face similarity operations to be performed, where a face in an image is used to generate search criteria from which a result of similar faces is programmatically determined. In one embodiment, a person is identified from an image. In particular, a face of a person is identified using face detection algorithms. Text and metadata associated with the image of the person are also identified. A similarity search is then performed using the image of the person in order to identify images of other persons that are similar in appearance to the person in the image. One or more embodiments further provide that at least some of the text and metadata are used to determine one or more classifications for the person in the image. The determined classifications are used as part of the similarity search.

For example, the determined classifications may be used to filter a search result, or enhance determinations made about the image when the image is analyzed.

One or more embodiments also provide a system for determining facial similarity. In an embodiment, the system includes an analysis module that is configured to identify (i) a face from an image, and (ii) at least one of text or metadata associated with the face of the image. Additionally, the system may include a characteristic determination module and a comparison module. The characteristic determination module is configured to identify one or more biographical classifications of the face based at least in part on the at least one of the text or metadata associated with the face of the face. The comparison module is configured to compare a query image input of the face with a collection of images of other faces in order to identify one or more faces in the collection that are determined as being similar to the face of the query image input. The query image input comprises image data representing the face and the one or more biographical classifications determined about the face using at least the text and metadata.

As used herein, the term "image data" is intended to mean data that corresponds to or is based on discrete portions of a captured image. For example, with digital images, such as those provided in a JPEG format, the image data may correspond to data or information about pixels that form the image, or data or information determined from pixels of the image. Another example of "image data" is signature or other non-textual data that represents a classification or identity of an object, as well as a global or local feature.

The terms "recognize", or "recognition", or variants thereof, in the context of an image or image data (e.g. "recognize an image") is meant to means that a determination is made as to what the image correlates to, represents, identifies, means, and/or a context provided by the image. Recognition does not mean a determination of identity by name, unless stated so expressly, as name identification may require an additional step of correlation.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 illustrates a simplified system for performing similarity searching of persons using various kinds of information, according to an embodiment of the invention. In an embodiment, a similarity search engine 110 is adapted or programmed to perform similarity searches of images, and of persons in particular. In an embodiment, a query image input 102 is used as a basis of comparison for finding other persons that have an appearance that is programmatically determined to be similar. Thus, search criteria may be generated to correspond to the query image input 102. The query image input 102 may correspond to an image of a face of a person that is to serve as the basis for comparison. For example, a user of a social network site may use his own image as input, for comparison and identification of other persons who share similarities. The engine 110 may use query image input 102 to generate result images 114, comprising a set of images that are programmatically determined to be similar to the face of the query image input 102. An embodiment of FIG. 1 assumes engine 110 includes or accesses a collection of images 120 in order to generate or identify the result images 114.

Different types of similarity searches are possible. In one embodiment, the query image input 102 is used to identify classifications or types of visual characteristics such as hair or eye color, or facial type. In another embodiment, the query image input 102 is based on recognition signatures, which can substantially uniquely identify persons. In the latter case, a feature vector that corresponds to a signature of a face may be compared against, for example, an index or library of other signatures for other faces. Vector distance algorithms may be used to compare one face against another face. Such feature vector comparisons of faces is described in parent U.S. patent application Ser. No. 11/246,742, entitled SYSTEM AND METHOD FOR ENABLING THE USE OF CAPTURED IMAGES THROUGH RECOGNITION, filed on Oct. 7, 2005.

As an alternative or addition to determining feature vectors that are signature identifiers of a person or a face, one or more embodiments provide for use of computer vision and analysis to detect additional visual features from the face of the query image input 102. The terms "face similarity" or "facial similarity" refer the act of retrieving a set of pictures of "result" faces which look similar to a given "query" face picture. In one embodiment, face similarity relies on visual features extracted from the query face, matching those features to similar features of the result faces. Those features can include skin tone, hair color, hair length, or a face model such as those used for face recognition (PCA (Principal Component Analysis), or LDA (Linear Discriminant Analysis)) as described in U.S. patent application Ser. No. 11/246,742, entitled SYSTEM AND METHOD FOR ENABLING THE USE OF CAPTURED IMAGES THROUGH RECOGNITION, filed on Oct. 7, 2005.

In one embodiment, eye color can be obtained by applying eye detection, followed by looking at color profiles around the detected eye. In another embodiment, hair color and length can be obtained by applying segmentation first. Segmentation groups face regions into three classes: (i) skin, (ii) hair, and (iii) background. A hair color may be obtained by determining color features such as color histogram, or dominant color descriptor on the pixels that are assigned as part of hair within segmentation. Similarly, the hair length can be obtained by looking at the span of the pixels that are assigned as part of the hair by segmentation.

As another alternative or addition, another facial feature that may be used by engine 110 to perform similarity searching may correspond to a type of face shape contained by the face of the query image input 102. For instance, the height and the width of a face, as well as a generalization or quantitative description of an overall head-shape (elongated or round shape) may provide another basis for identifying results 114. This information can be extracted using various means. In one embodiment, segmentation output is used in analyzing the query image input 102. The width and height can be determined using the span of the pixels that are assigned as skin during segmentation. In another embodiment, a classifier-based approach can be used. A training set of elongated and round faces is collected. As an example, a learning algorithm such as Adaboost, or support vector classifier or nearest neighbor classifier can be used to learn how to classify a face as elongated or round based on the training set.

As another alternative or addition, another facial feature that may be used by engine 110 to perform similarity searching is skin color. As described above, a segmentation output can be used to determine the skin color. The skin color can be obtained by getting color features such as color histogram, or dominant color descriptor on the pixels that are assigned as part of skin within segmentation.

As another alternative or addition, another facial feature that may be used by engine 110 to perform similarity searching is a classification corresponding to whether the person of the query image input 102 is wearing eyeglasses. In one embodiment, a classifier-based approach can be used. A training set of faces with and without glasses is collected. As an example, a learning algorithm such as Adaboost, or support vector classifier or nearest neighbor classifier can be used to learn how to classify a face as with or without glasses based on the training set.

As another alternative or addition, another facial feature that may be used by engine 110 to perform similarity searching is a classification corresponding to whether the person of the query image input 102 has facial hair, such as a mustache or beard. Numerous algorithms may be used to detect the facial fair. In one embodiment, key points are detected in the face. Such key points may correspond to the tip of the nose, or the mouth corners. Then, the pixels between the mouth and the nose are analyzed. The color and the texture of this region can be compared to an obviously skin region, such as the forehead, nose, or cheeks. The difference between the color and texture is an indication of a mustache. In another embodiment, a classifier-based approach can be used. A training set of faces with and without facial hair is collected. As an example, a learning algorithm such as Adaboost, or support vector classifier or nearest neighbor classifier can be used to learn how to classify a face as with or without facial hair based on the training set.

Embodiments described herein further recognize that certain classifications about a person's appearance may also be inferred from other sources of information, rather than the query image input 102. In particular, embodiments recognize that biographic information may yield clues to classifications about a person's appearance, and these clues may enable similarity searching to be performed in a manner that a viewer deems to be more reliable. For example, programmatic analysis of images of faces may be unreliable in determining gender.

Embodiments described herein recognize that visual features are not always representative of classifications that people would consider important when viewing similarity searches. Specifically, the use of visual features in similarity searching may not always be reliable in determining ethnicity, age classification, or gender. For example, on a social network, a person seeking a similarity match to a male is not interested in seeing a female. As another example, similarity matching amongst persons of different ethnicity may not result in matches that the human eye would consider similar. Moreover, the accuracy of some inferences of classification may be hindered if the query image input 102 has low quality or contains ambiguous cues (presence of sunglasses, hat, etc.)

One or more embodiments described herein assume that the query face and/or images in the collection 120 the provide the result images 114 have a known identity or extraneous biographical information 104 attached or associated to them. Accordingly, the biographical information 104 may have the role of forming a criteria or parameter by which images are filtered when determining whether images from collection 120 or sufficiently similar. In such embodiments, biographical information 114 may be determined from, for example, user-input and/or the context of environment in which the image is placed. For example, on a social networking or match making site, the biographical information 114 may have been provided by the user when his or her account or profile were established. In such embodiments, the biographical information may be retrieved from the text of the person's profile.

As described herein, such biographical information 104 may take several forms, some of which can be used independently or in conjunction with each other to create additional features to assist in enhancing similarity matching algorithms.

In one embodiment, the biographical information 104 and its relationship to the face of the query image input 102 can be obtained through a combination of factors or processes, such as through the use of a face recognition system which associates the set of recognized faces to identities known to the system. According to an embodiment, elements of an identity can incorporate one or more of the following: (i) the first name of the person; (ii) the last name of the person; (iii) external biographical data about the person: gender, age, ethnicity, place of living, hair color, style and length; (iv) a nickname for that person ("cutechick", "dad"); (v) a set of example face images for that person, possibly tagged with the date at which the picture was taken; (vi) the person's relationship to a social network comprising his/her friends and/or family members; (vii) a geographically labeled photo album belonging to that person; and (viii) a location obtained from the IP address of the computer that he/she uses or uploads his photographs to a server.

Some or all of the biographical information 104 may be used by the engine 110 in order to perform similarity searching of a face and/or person in the query image input 102. In one embodiment, the resulting images 114 may be determined by using the biographical information to either (i) filter an initial set of resulting images that are identified from similarity searching the collection of images 120, or (ii) by filtering the collection of images 120 before performing the similarity searching. As an addition or alternative, biographical information 114 may be used to rank images of result 114, and/or to weight parameters representing visual similarities (e.g. hair color, face type) when the similarity search is performed.

System for Analyzing Content Items Carrying Images

Figure 2:
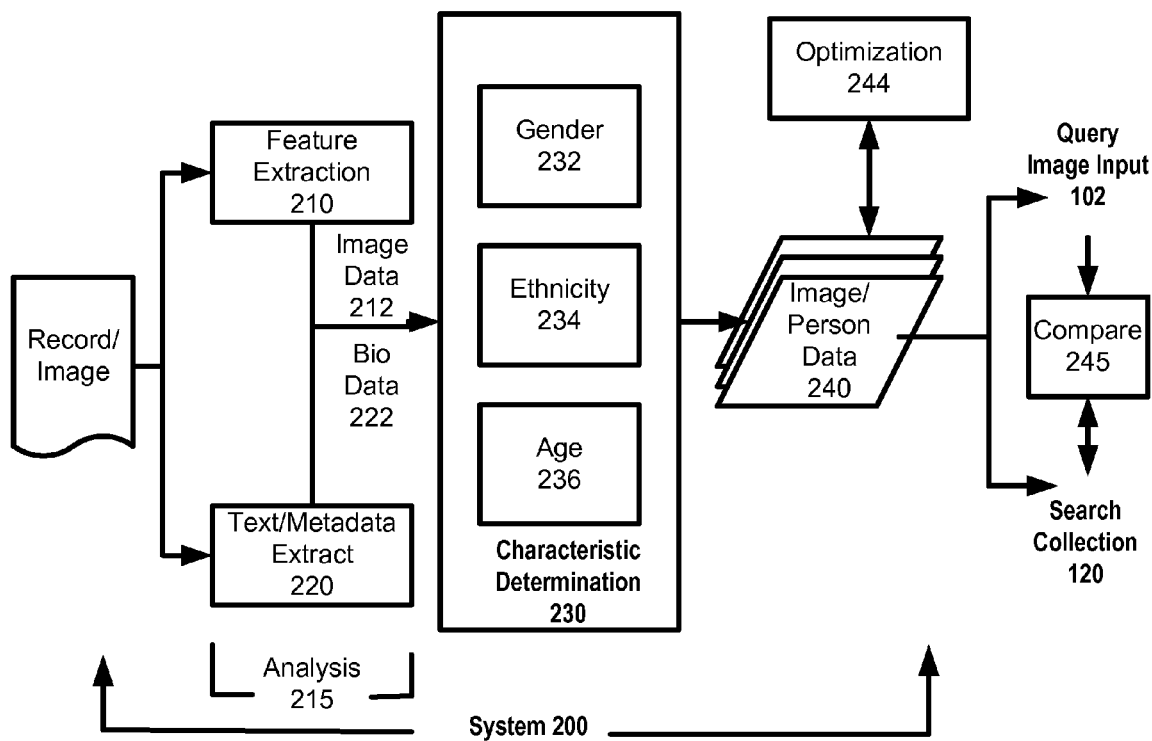
FIG. 2 illustrates components for use in enabling similarity searches of persons, according to one or more embodiments of the invention.

FIG. 2 illustrates components for use in enabling similarity searches of persons, according to one or more embodiments of the invention. A system such as described with an embodiment of FIG. 2 may be used to provide some or all of the functionality of engine 110, as well as to provide data (query image input 102 and collection 120) used by engine 110.

Accordingly, a system 200 may include modules that correspond to analysis 215, characteristic determination 230, and comparison 245. The analysis module 215 may include sub-modules or components of feature extraction 210 and text/metadata extraction 220. The input for system 200 may include records 202 that are associated with individuals. For each person, record(s) 202 may include a set of one or more images and text and/or metadata. The input records 202 may be used as part of a backend process to build the collection of records 120 (FIG. 1) that is searched. Additionally, input records 202 may correspond to the query input image 102 (FIG. 1). System 200 may process records 202 as query input image 102 on either a backend process or as a front end process (e.g. on-the-fly).

In an embodiment, system 200 outputs a profile data set 230 for individual persons. The profile data sets 230 are searched for similarities against the query input image 102. According to an embodiment, the profile data set 230 may include (i) image data that represents the image of the record 202, such as images in the form of features as extracted by the extraction module 210; (ii) classifications of gender, ethnicity, age or other biographical classification; and (iii) optionally an identity of the person that is the subject of the record. In one embodiment, the profile data set 230 of a given person or face is created and/or retrieved as the query image input 102 when similarities are desired for that face or person.

The comparison module 245 may perform the operations of comparing the profile data set 230 for the query image input 102 (whether retrieved from data store or determined on the fly) against the profile data sets 230 of images in the collection 120. In making a determination of similarity, various parameters may be used as criteria in determining whether individual records or images of collection 120 satisfy a similarity threshold for the query image input 102. One or more embodiments also rank any images in the collection 120 that satisfy the similarity threshold, meaning those images that are deemed most similar may rank higher than other images that satisfy the threshold but are less similar. In one implementation, higher ranked images are displayed first or otherwise more prominently.

In an embodiment, the input record 202 may correspond to one or more of an image, a collection of images, labels or tags provided with the image, and/or profile information provided in connection with a context or source of that image. For example, system 200 may be implemented for individuals who upload or submit a collection of personal images as part of a photo-sharing site. In one embodiment, the images of the input record 202 have not previously been processed or recognized, and feature extraction 210 identifies image data 212 that corresponds to features of the person or persons in the images of the records 202. As an alternative, the images of the input records 202 may be associated with, for example, previously determined vector signatures that are then identified and used by system 200.

The text/metadata extraction 220 identifies and/or extracts text or metadata information that includes biographical information 222. However, embodiments recognize that not all extracted text/metadata may be biographical information 222. As such, extracted words or phrases may initially be viewed as candidates for determining subsequent classifications. The biographical information 222, along with image data 212 (if present), is used by the characteristic determination 230 to generate the profile data set 240 for a person. One or more embodiments provide that the characteristic determination 230 determines gender, ethnicity, and/or age classification.

Gender:
In one embodiment, gender component 232 makes a gender determination for a subject of a person in a given input record 202 using a combination of biographical information 222 and image data 212. The biographical information 222 used may correspond to a first name of the person, or a nickname derived from label or text in other content (e.g. name of person who created a file or is named on a blog of a social network). For example, certain names or labels may be associated with one gender or another (e.g. "Mark" for male, "Emily" for female). Other biographical data may also be used (e.g. the image of the person is labeled "I'm pregnant"). The image data 212 may correspond to pixels or image elements of the image in the input record 202 being subjected to a gender classifier. In one embodiment, a person provides numerous input images as part of record(s) 202, and the gender classifier is applied to each face in a set of example faces (that are determined to be of the same person), combined using, for example, a voting scheme.

Ethnicity:
The ethnicity component 234 of the characteristic determination 230 may use biographical information 222 to programmatically and/or automatically learn or determine an ethnicity of a person. Ethnicity determination may use biographical information such as (i) a combination of the first and last name of that person; (ii) ethnicity of people in the person's social network; (iii) the most frequent geographic location of the person's pictures; (iv) an ethnicity classifier applied to the image data 212 representing each face in an set of example faces, combined for using, for example, a voting scheme. The first name and the last name can be used as a whole, or they can be syllables of the first name or the second name. In the latter case, the words can be broken into syllables along with position markers: beginning, middle, end of word. In one embodiment, ethnicity statistics may be collected for each syllable. A naive Bayes classifier may be used to come up with a posterior for each ethnicity.

Age:
An age component 232 of the characteristic determination 230 may automatically learn an age classification of a person that is the subject of records 202, using biographical information corresponding to, for example, (i) the first name or nickname of that person (for example: "dad" implies an adult . . . ); (ii) the age of persons in the person's social network; (iii) the span of image capture dates in an image library provided by that person (for example, if that person has pictures taken 20 years ago, then it implies an adult); and (iv) an age group classifier applied to the image data 212 representing each face in an example set, combined taking into account aging based on the picture timestamps.

Classifiers that operate on image data 212 to determine gender, ethnicity, and age classification are described in more detail with, for example, U.S. patent application Ser. No. 11/246,742, entitled SYSTEM AND METHOD FOR ENABLING THE USE OF CAPTURED IMAGES THROUGH RECOGNITION, filed on Oct. 7, 2005.

One or more embodiments also provide for use of an optimization module 244 that implements one or more optimization functions or processes for use with system 200. In one embodiment, the optimization module 230 includes functionality for automatically determining a 'goodness' (or degree of suitability for image searching) of an image of a face. In one embodiment, the optimization module discards images that are deemed unsuitable for the similarity searching. The determination may be made on a so-called goodness measure. In one implementation, a goodness measure may quantify clarity, lighting, and pose in determining whether a given image is usable in either the collection 120 (FIG. 1) or as the query image input 102 (FIG. 1). A goodness measure can also be made specific to a set of images of a particular person or to a classification of a type of person using learned algorithms. In such cases, the goodness measure may be determined automatically using regression techniques, such as least square fitting to linear and quadratic functions of visual features. As an example, any types of feature vectors can be used for this purpose. For instance, bad/good lighting classifiers, bad/good pose classifiers, face appearance models (PCA, LDA, etc) can all be used to learn a generic goodness metric for each face.

In an embodiment, the optimization module 244 may also be configured to automatically determine an optimal set of visual features to use to drive a similarity search. Such an embodiment recognizes that it is more difficult to find similarity results for an image of a face that, for example, has a non-frontal pose, bad lighting, has the person/face off in the distance, is blurry, or otherwise partially occludes the subject of the image. For a given set of images for a person or class, the optimizer may execute functionality for determining which subset of examples in a set of face examples to use to extract features. This determination may be based on: (i) the quality of the face pictures, (ii) the distance in time to the query image to ensure that the selected query face is not too dissimilar in terms of age and facial features (such as facial hair or haircut), (iii) a pose, and (iv) lighting variations on a face of an image.

Additionally, optimizer 244 may incorporate metrics for programmatically learning a degree of ethnic/demographic relationship between people based on their names. For example, two people with similar names have a better chance of (i) being part of the same ethnic group (some Asian countries have little variability in their last name); (ii) being of the same gender (same first name); (iii) being of similar age (same first name); (iv) being part of the same family (same last name); and (v) being the same person (same first and last name). As a result, a measure of the degree of closeness between two names, which can be based for example on an edit distance, is an additional hint that the faces of these people might be perceived as more similar. The optimizer 244 may incorporate these relationships in the profile data sets 240 for subsequent use. Alternatively, the characteristic determination may incorporate the functionality described in this paragraph when analyzing the record 202, either on the back-end or front-end and on-the-fly.

Embodiments recognize that some records 202 incorporate identity information, meaning information (e.g. full name) that uniquely identifies that person. This information is useful for a variety of purposes. However, if identity information is not available for either the query or result images, automatic labeling can be used as a fall back mechanism. Automatic labeling improves the quality of the similarity features, thereby simplifying indexing and improving the result quality, especially for low quality query images.

Figure 3:
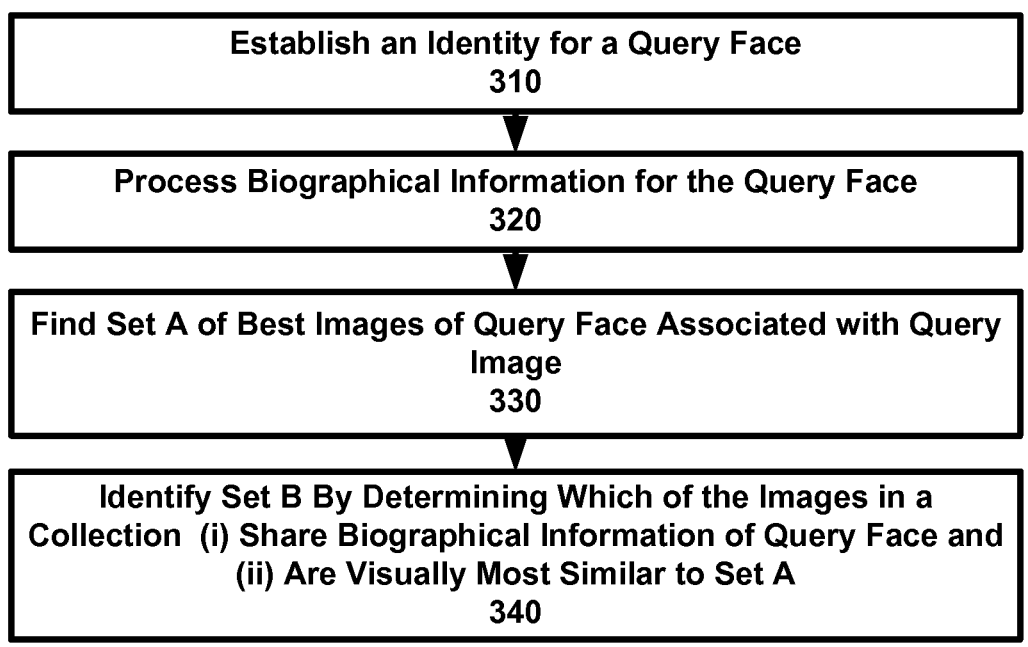
FIG. 3 illustrates a method for enabling a similarity search to be performed on an image of a face, according to an embodiment of the invention.

FIG. 3 illustrates a method for enabling a similarity search to be performed on an image of a face, according to an embodiment of the invention. A method such as described may be implemented using, for example, a system such as described with FIG. 1 or FIG. 2. As such, reference to elements of an embodiment of FIG. 2 is made for purpose of illustrating a suitable component for performing a step or sub-step being described.

In a step 310, the query input image 102 (FIG. 1) is determined or identified. In one embodiment, a face in the image is detected, and an identity is established for the face in the image. This identity may be determined either through user-tagging or through a face recognition process (which can be semi-supervised by the user). A suitable facial recognition system or process is described in U.S. patent application Ser. No. 11/246,742, entitled SYSTEM AND METHOD FOR ENABLING THE USE OF CAPTURED IMAGES THROUGH RECOGNITION, filed on Oct. 7, 2005.

In step 320, biographical information for the face of the query image input is determined or retrieved. The text/metadata extraction module 220 may be used to determine the biographical information on-the-fly. Alternatively, the query image input 102 may already have that information associated with it. From the biographical information available for that face, one or more embodiments provide that the person's identity is optionally established (if not already known). Additionally, as described with an embodiment of FIG. 2, a gender, ethnicity and age classification of a person in the query image input 102 is determined. The output of engine 110 may be restricted to provide results which share at least some (if not all) similar biographical information 222.

Step 330 provides that (i) images depicting a face of a person with the same identity as the query image input 102 are identified, (ii) from the identified images, a subset ('Set A') of faces which are the best query faces are identified. In one embodiment, the similarity search is performed using the subset of images of the same person. As previously described, a good subset could be a set of frontal shots which are close in time to the original query image, or faces with high 'goodness' score as described in the earlier section.

Step 340 provides that a similarity search is performed with the subset of images of the query image input 102, taking into account the biographical information 222 associated with the person or identify of the input. From collection 120, a result set of faces is identified, where persons of the result set share some or all (or have similar) biographical information 222. These persons may also have faces that are deemed to be similar to that of the query image input 102. The visual similarity may be performed using, for example, a PCA model in combination with models for facial hair, glasses, hair color and haircut. A weighted distance combination can be used using these features. The weighting itself can be learnt using statistical classification techniques such as Linear Discriminant Analysis (LDA). The retrieval can be performed using a nearest neighbor algorithm which selects a subset of the faces expected to be the closest to the target set of faces, followed by shortest distance search within that subset. The outcome of this process may correspond to the result images 114, or otherwise a list of result faces which are most similar to the query face.

As an addition or alternative step, one or more embodiments provide for a method such as described to further determine an identity of persons shown in the result image set 114. If a person has multiple images in the result set 114, it is more likely that the two persons (i.e. the person of the query image input 102 and the person having multiple images depicted in the result set 144) or the same person.

As another addition or alternative, one or more embodiments provide for reordering images in the result set 114 based on a combination of the similarity distance and the degree of closeness of the names of the people they belong to. Thus, the name of the person may provide key biographic information 222 for use in the similarity searching.

As another addition or alternative, one or more embodiments provide finding identities of persons in the result set 114, then scanning the collection for images of those identified persons sharing the same pose of the face or person of the query image input 102. Rather than return the original image, the image with the matching pose of the person deemed to be similar is returned. This image may look more similar to the user, given the matching pose.

In another embodiment, a human team may review the results of visual features as extracted or determined by system 200. As an example, the results of ethnicity can be reviewed and corrected by human beings. U.S. Patent Application No. 60/864,781 describes a manual editor interface ("manual enrichment") that presents recognition or image analysis images to editors in cascade (numerous panels shown at once, with each panel containing the subject image and the determined information about that image). The editor or human is offered to uncheck the determined result if it is not correct. For example, if an Asian person is marked white as a result of recognition performed on the face of the image, the editor may simply uncheck "Caucasian" in a panel where the Asian person is shown. One or more embodiments provide for a fast editor user-interface. For instance, the user-interface may group images of persons in one cascade or sheet, that are all deemed blonde and male. A dozen or tens of images may be listed. The editor simply marks (or unmarks) the image of the person that is not blonde and male.

Accordingly, one or more embodiments provide for a data flow that includes establishing an identify of a given face in the query image input 102. The identity may be determined either through user tagging or through a face recognition process (which can be semi-supervised by the user).

Next, computer vision algorithms may be executed on the test images to calculate the visual features, such as gender, ethnicity, hair color, hair length, eye color, with/without eye glasses.

An editor interface may be provided to review the results. As described above, the results may be reviewed in groups or clusters.

From the biographical information available for a face in an image, one or more embodiments provide for establishing the person's identity (if not already available), gender, and age characteristics.

From the set of faces associated to the same identity as the query image input 102, embodiments determine a subset of faces that match both visually and with biographical information. As previously described, a good subset could be a set of frontal shots which are close in time to the original query image, or faces with high 'goodness' score as described in the earlier section.

Using this new set of query faces, one or more embodiments determine, from within the set of faces which share similar biographical data as well as visual features, which faces are the closest based on visual features. The determination may be made through, for example, a PCA model in combination with models for facial hair, glasses, hair color and haircut. A weighted distance combination can be used using these features. The weighting itself can be learnt using statistical classification techniques such as Linear Discriminant Analysis (LDA). The retrieval can be performed using a nearest neighbor algorithm which selects a subset of the faces expected to be the closest to the target set of faces, followed by shortest distance search within that subset. The outcome of this process is a list of result faces which are most similar to the query face.

Numerous variations and options, such as described with an embodiment of FIG. 3 may the be implemented.

Any of the embodiments described with FIG. 1 thru FIG. 3 may be performed by computers, including general purpose computers, connected (to a network or the Internet) computers, or combinations of client-server computers and/or peer-to-peer terminals. In one embodiment, for example, system 200 is provided on a server, and accessed by a user through a web interface. However, alternatives are possible, including use of standalone computers to provide system 200.

Alternative Embodiments

While embodiments described herein provide for use of biographical information from metadata and text data, biographical image in the form of text can be determined from the contents of the image. For example, an image of a person may show text imprint on a shirt or on an associated sign in the image. This text may be detected, then recognized and used to decipher clues about classifications (e.g. gender, ethnicity and age classification) of the person. U.S. patent application Ser. No. 11/246,742, entitled SYSTEM AND METHOD FOR ENABLING THE USE OF CAPTURED IMAGES THROUGH RECOGNITION, filed on Oct. 7, 2005; describes techniques for detecting, recognizing and using such text from images of persons.

It is contemplated for embodiments of the invention to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer-implemented method for determining face similarity, the method comprising:
   identifying a person from an image associated with an account of a user of a social network;
   identifying at least one of text or metadata associated with the image by the social network;
   determining one or more or more classifications corresponding to an ethnicity, a gender or an age classification of the person in the image, using the at least one of text and metadata;
   in response to the user initiating a search for other users of the social network, performing a similarity search using the person of the image, in order to identify images of other persons that are similar in appearance to the person in the image and that share the one or more classifications of the person in the image; and
   providing, to the user, a search result based on at least one identified image from the similarity search.

2. The method of claim 1, wherein identifying at least one of text or metadata associated with the image includes determining biographical information about the person in the image using the text and metadata.

3. The method of claim 1, wherein determining one or more of the classifications further comprises using image data from the image of the person to determine one or more of the classifications corresponding to the ethnicity, the gender or the age classification.

4. The method of claim 1, wherein identifying a person from an image includes detecting a face of the person from the image, including one or more features of the face.

5. The method of claim 1, wherein performing the similarity search includes formulating a search query to include image data that represents one or more visual characteristics of a face of the person.

6. The method of claim 1, wherein identifying at least one of text or metadata associated with the image includes identifying a text contained in a file that includes the image of the person.

7. The method of claim 1, wherein identifying at least one of text or metadata associated with the image includes identifying a label or a tag provided with the image.

8. The method of claim 1, wherein identifying at least one of text or metadata associated with the image includes identifying a text contained in the image.

9. A system comprising one or more computers configured to perform operations comprising:
 identifying a person from an image associated with an account of a user of a social network;
 identifying at least one of text or metadata associated with the image by the social network;
 determining one or more or more classifications corresponding to an ethnicity, a gender or an age classification of the person in the image, using the at least one of text and metadata;
 in response to the user initiating a search for other users of the social network, performing a similarity search using the person of the image, in order to identify images of other persons that are similar in appearance to the person in the image and that share the one or more classifications of the person in the image; and
 providing, to the user, a search result based on at least one identified image from the similarity search.

10. The method of claim 1, wherein identifying at least one of text or metadata associated with the image includes determining biographical information about the person in the image using the text and metadata.

11. The method of claim 1, wherein determining one or more of the classifications further comprises using image data from the image of the person to determine one or more of the classifications corresponding to the ethnicity, the gender or the age classification.

12. The method of claim 1, wherein identifying a person from an image includes detecting a face of the person from the image, including one or more features of the face.

13. The method of claim 1, wherein performing the similarity search includes formulating a search query to include image data that represents one or more visual characteristics of a face of the person.

14. The method of claim 1, wherein identifying at least one of text or metadata associated with the image includes identifying a text contained in a file that includes the image of the person.

15. The method of claim 1, wherein identifying at least one of text or metadata associated with the image includes identifying a label or a tag provided with the image.

16. The method of claim 1, wherein identifying at least one of text or metadata associated with the image includes identifying a text contained in the image.

17. A non-transitory computer-readable medium for determining face similarity, the computer-readable medium comprising instructions, that when executed by one or more processors, cause the one or more processors to perform steps comprising:
 identifying a person from an image associated with an account of a user of a social network;
 identifying at least one of text or metadata associated with the image by the social network;
 determining one or more or more classifications corresponding to an ethnicity, a gender or an age classification of the person in the image, using the at least one of text and metadata;
 in response to the user initiating a search for other users of the social network, performing a similarity search using the person of the image, in order to identify images of other persons that are similar in appearance to the person in the image and that share the one or more classifications of the person in the image; and
 providing, to the user, a search result based on at least one identified image from the similarity search.

* * * * *